(12) United States Patent        (10) Patent No.:     US 6,499,869 B1
     Southworth                  (45) Date of Patent:     Dec. 31, 2002

(54) VEHICLE LANE VERIFICATION DEVICE AND METHOD

(76) Inventor: Kenneth S. Southworth, 170 Trinity Cir., DeLand, FL (US) 32720

( * ) Notice: Subject to any disclaimer, the term of this patent is extended or adjusted under 35 U.S.C. 154(b) by 0 days.

(21) Appl. No.: 09/749,071

(22) Filed: Dec. 27, 2000

(51) Int. Cl.⁷ .................................................. F21V 21/00
(52) U.S. Cl. ....................... 362/504; 362/503; 362/540; 362/396; 33/264
(58) Field of Search ................................ 362/504, 540, 362/503, 397, 396; 33/264, 275 R; 280/727

(56) References Cited

U.S. PATENT DOCUMENTS

| | | | | |
|---|---|---|---|---|
| 2,583,777 A | * | 2/1952 | Adofson | 362/503 |
| 4,823,471 A | * | 4/1989 | Van Schaack | 33/264 |
| 4,894,921 A | * | 1/1990 | Barlow | |
| 6,126,303 A | * | 10/2000 | Gross | 362/545 |

* cited by examiner

Primary Examiner—Sandra O'Shea
Assistant Examiner—Guiyoung Lee
(74) Attorney, Agent, or Firm—Joseph N. Breaux

(57) ABSTRACT

A device and method used by a driver to verify that he/she is positioning a vehicle safely within the designated lane of travel area of a roadway. The device includes an LED sighting unit having an aiming LED and an attachment mechanism for attaching the LED sighting unit to the windshield of a vehicle. In the method, the driver positions the vehicle safely within the lane of travel area of a roadway and then adjusts the position of the LED sighting unit until the aiming LED thereof is within the line of sight of the driver's eyes, while the driver is seated in the normal driving position, and the boundary line between the lanes or along the side of a roadway.

1 Claim, 4 Drawing Sheets

VEHICLE LANE VERIFICATION DEVICE AND METHOD

TECHNICAL FIELD

The present invention relates to vehicle safety equipment and more particularly to a vehicle lane position verification device that includes an LED sighting unit having an aiming LED extending from a battery housing with a battery connector provided therein and an on/off switch in connection therewith that is wired in series electrical connection with the aiming LED and the battery connector in a manner such that the on/off switch controls operation of the aiming LED when batteries are positioned in the battery connector; and an attachment mechanism for attaching the LED sighting unit to the windshield of a vehicle. The vehicle lane position verification device may also include an LED sighting unit and an attachment mechanism for attaching the LED sighting unit in connection with the windshield of a vehicle; the attachment mechanism including a slide bar assembly including a slide bar support mechanism for securing the slide bar in fixed relation to a windshield of a vehicle; the LED sighting unit including aiming LED having a power supply cable connectable to an electrical power source and user moveable LED clamp mechanism; the aiming LED being supported by the user moveable LED clamp mechanism; the user moveable LED clamp mechanism including a pair of resilient locking legs each including a slide bar receiving aperture provided therethrough of greater size than the slide bar and biased away from the other resilient locking leg such that the pair of resilient locking legs exert a gripping and holding force against the slide bar when the slide bar is inserted through the two slide bar receiving apertures; the pair of resilient locking legs releasing the gripping and holding force against the slide bar when the pair of resilient locking legs are squeezed toward each other allowing a user to position the user moveable LED clamp mechanism at various user selected locations along the slide bar. In a preferred embodiment, the slide bar support mechanism is two suction cups one provided at each end of the slide bar.

BACKGROUND ART

It is often difficult for some drivers, particularly when driving a large vehicle such as a motor home, to feel confident about the location of the vehicle within the lane of travel area of a roadway. This can cause anxiety to the driver at best and can lead to dangerous conditions and accidents at worst. It would be a benefit, therefore, to have a device that would allow a driver to verify that he/she is positioning the vehicle safely within the designated lane of travel area of the roadway. Because roads typically have a marker line between the lanes and/or running along the outer edge of a lane, it would be desirable to have a vehicle lane position verification device and/or method that allowed a driver to use either of these landmarks as a reference point for maintaining the vehicle safely within the lane of travel.

GENERAL SUMMARY DISCUSSION OF INVENTION

It is thus an object of the invention to provide a vehicle lane position verification device that includes an LED sighting unit having an aiming LED extending from a battery housing with a battery connector provided therein and an on/off switch in connection therewith that is wired in series electrical connection with the aiming LED and the battery connector in a manner such that the on/off switch controls operation of the aiming LED when batteries are positioned in the battery connector; and an attachment mechanism for attaching the LED sighting unit to the windshield of a vehicle.

It is a further object of the invention to provide a vehicle lane position verification device that includes an LED sighting unit and an attachment mechanism for attaching the LED sighting unit in connection with the windshield of a vehicle; the attachment mechanism including a slide bar assembly including a slide bar support mechanism for securing the slide bar in fixed relation to a windshield of a vehicle; the LED sighting unit including aiming LED having a power supply cable connectable to an electrical power source and user moveable LED clamp mechanism; the aiming LED being supported by the user moveable LED clamp mechanism; the user moveable LED clamp mechanism including a pair of resilient locking legs each including a slide bar receiving aperture provided therethrough of greater size than the slide bar and biased away from the other resilient locking leg such that the pair of resilient locking legs exert a gripping and holding force against the slide bar when the slide bar is inserted through the two slide bar receiving apertures; the pair of resilient locking legs releasing the gripping and holding force against the slide bar when the pair of resilient locking legs are squeezed toward each other allowing a user to position the user moveable LED clamp mechanism at various user selected locations along the slide bar. In a preferred embodiment, the slide bar support mechanism is two suction cups one provided at each end of the slide bar.

It is another object of the invention to provide a vehicle lane position verification method for allowing a driver to maintain a vehicle having a driver's seat and a windshield within a lane of travel of a roadway; the vehicle lane position verification method including the steps of: a) providing a vehicle lane position verification device as described herein above; b) positioning the vehicle in a lane of a roadway divided by a lane marker line at a desired distance from the lane marker line; c) positioning the driver in a driver's seat of the vehicle after performing step b); and d) attaching the vehicle lane position verification device to a windshield of a vehicle with the attachment mechanism such that the aiming diode is along the line of sight between the driver's eyes and the lane marker line such that the driver can verify the position of the vehicle with respect to the lane marker line by maintaining the aiming LED along the line of sight between the driver's eyes and the lane marker line.

Accordingly, a vehicle lane verification device and method is provided. In the vehicle lane verification device aspect of the invention, the device includes an LED sighting unit having an aiming LED extending from a battery housing with a battery connector provided therein and an on/off switch in connection therewith that is wired in series electrical connection with the aiming LED and the battery connector in a manner such that the on/off switch controls operation of the aiming LED when batteries are positioned in the battery connector; and an attachment mechanism for attaching the LED sighting unit to the windshield of a vehicle. The attachment mechanism preferably includes an elongated, adhesive backed section of hook and pile fastener material that is adhesively securable to the windshield of a vehicle and a companionate section of hook and pile material that is secured to the LED sighting unit such that the each driver of the vehicle may easily position the LED sighting unit in the proper location for his/her use.

In another preferred embodiment, the vehicle lane verification device includes an LED sighting unit and an attachment mechanism for attaching the LED sighting unit in connection with the windshield of a vehicle; the attachment mechanism including a slide bar assembly including a slide bar support mechanism for securing the slide bar in fixed relation to a windshield of a vehicle; the LED sighting unit including aiming LED having a power supply cable connectable to an electrical power source and user moveable LED clamp mechanism; the aiming LED being supported by the user moveable LED clamp mechanism; the user moveable LED clamp mechanism including a pair of resilient locking legs each including a slide bar receiving aperture provided therethrough of greater size than the slide bar and biased away from the other resilient locking leg such that the pair of resilient locking legs exert a gripping and holding force against the slide bar when the slide bar is inserted through the two slide bar receiving apertures; the pair of resilient locking legs releasing the gripping and holding force against the slide bar when the pair of resilient locking legs are squeezed toward each other allowing a user to position the user moveable LED clamp mechanism at various user selected locations along the slide bar. In a preferred embodiment, the slide bar support mechanism is two suction cups one provided at each end of the slide bar.

In the method aspect of the invention, a vehicle lane position verification method for allowing a driver to maintain a vehicle having a driver's seat and a windshield within a lane of travel of a roadway; the vehicle lane position verification method including the steps of: a) providing a vehicle lane position verification device as described herein above; b) positioning the vehicle in a lane of a roadway divided by a lane marker line at a desired distance from the lane marker line; c) positioning the driver in a driver's seat of the vehicle after performing step b); and d) attaching the vehicle lane position verification device to a windshield of a vehicle with the attachment mechanism such that the aiming diode is along the line of sight between the driver's eyes and the lane marker line such that the driver can verify the position of the vehicle with respect to the lane marker line by maintaining the aiming LED along the line of sight between the driver's eyes and the lane marker line.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

EXEMPLARY MODE FOR CARRYING OUT THE INVENTION

Figure 1:
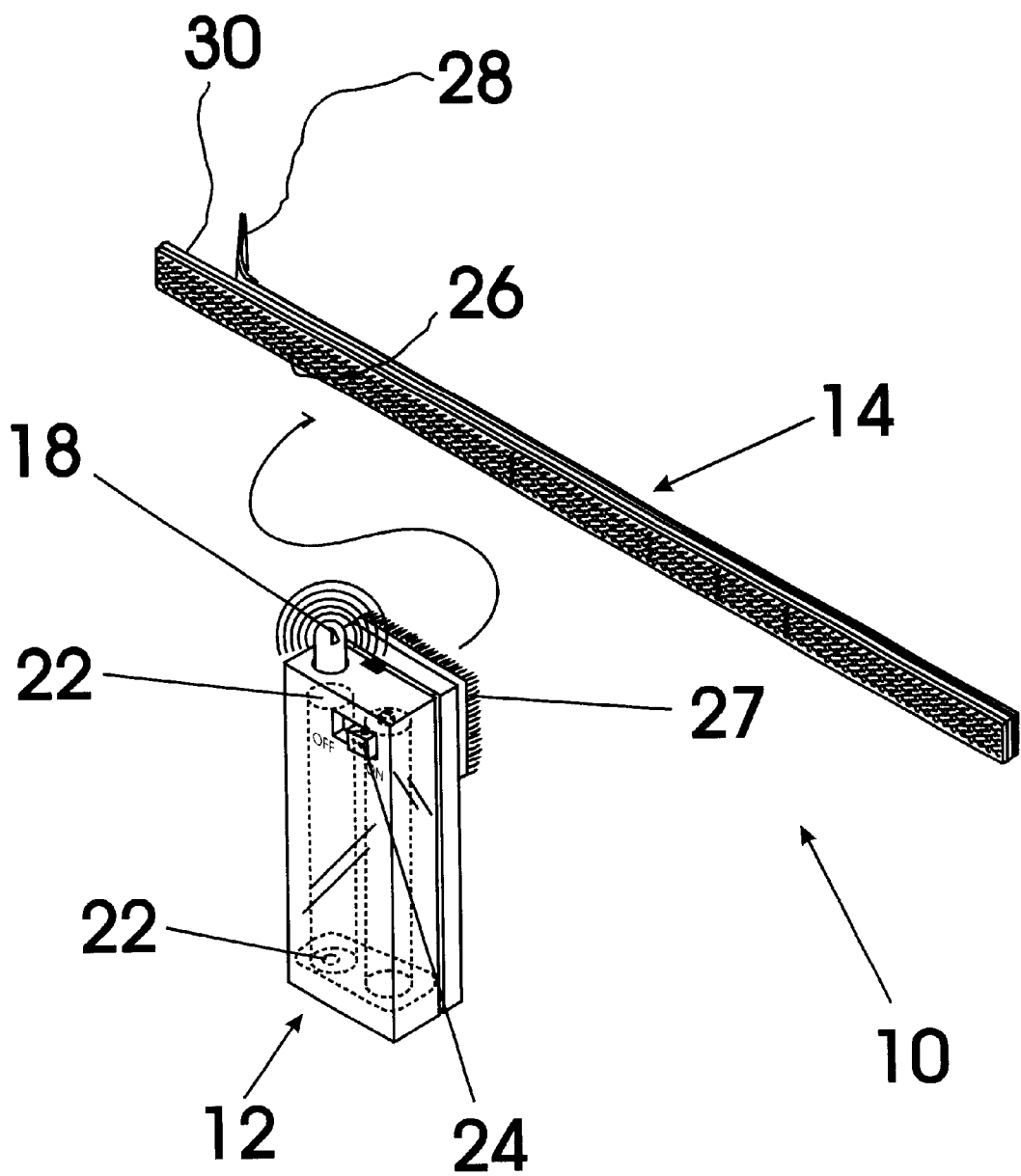
FIG. 1 is a perspective view of a first exemplary embodiment of the vehicle lane position verification device of the present invention showing the LED sighting unit and the attachment mechanism for attaching the LED sighting unit in connection with the windshield of a vehicle.

FIG. 1 shows various aspects of a first exemplary embodiment of the vehicle lane position verification device of the present invention generally designated 10. Vehicle lane position verification device 10 includes an LED sighting unit, generally designated 12, and an attachment mechanism, generally designated 14, for attaching the LED sighting unit 12 to the windshield of a vehicle.

LED sighting unit 12 includes an aiming LED 18 extending from a battery housing 20 with a battery connector 22 (shown in dashed lines) provided therein and an on/off switch 24 in connection therewith that is wired in series electrical connection with aiming LED 18 and battery connector 22 in a manner such that on/off switch 24 controls operation of aiming LED 18 when batteries are positioned in battery connector 22. In each embodiment, the aiming LED 18 may be provided with a series resistor to limit the current flow through aiming LED 18 to a current level within the proper operating range for any particular LED chosen for use as the aiming LED 18. In addition, each aiming LED 18 must have sufficient luminance when on for the light from the aiming LED to be visible during daylight conditions. In this embodiment, attachment mechanism 14 includes an elongated, adhesive backed section 26 of hook and pile fastener material that is adhesively securable to the windshield of a vehicle and a companionate section of hook and pile material 27 that is secured to the LED sighting unit 12 such that each driver of the vehicle may easily position the LED sighting unit 12 in the proper location for his/her use. Elongated, adhesive backed section 26 of hook and pile fastener material has a peel off cover 28 that is peeled from the adhesive layer 30 just prior to pressing adhesive layer 30 to the interior surface of a vehicle windshield at a suitable location to allow the aiming LED 18 to be properly positioned for each driver, as described herein further detail below in the method aspect of the invention.

Figure 2:
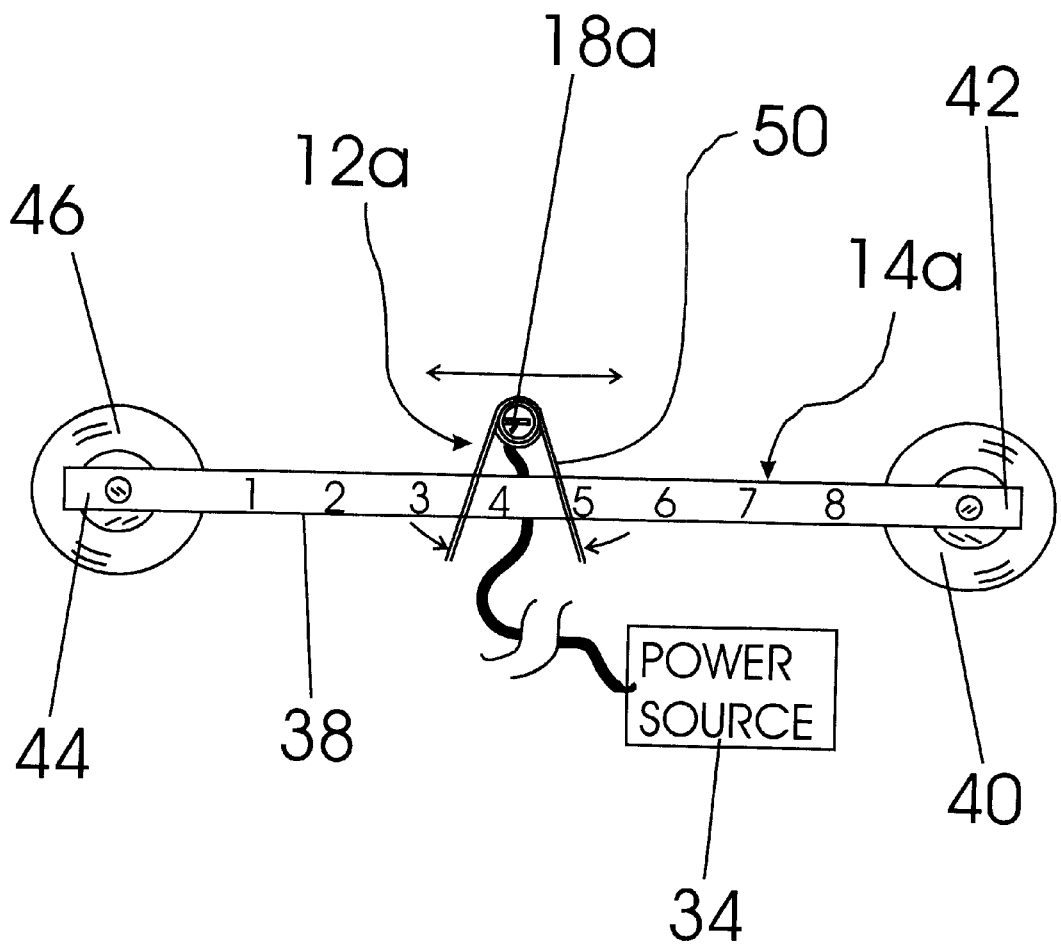
FIG. 2 is a front plan view of a second exemplary embodiment of the vehicle lane verification device of the present invention showing the aiming LED of the LED sighting unit and an exemplary attachment mechanism for attaching the LED sighting unit in connection with the windshield of a vehicle that includes a slide bar having a suction cup at each end; the aiming LED being supported on the slide bar assembly by the user moveable LED clamp mechanism; and the slide bar assembly including a slide bar support mechanism formed from a pair of windshield attachment suction cups between which the slide bar is secured; the slide bar having user identifiable marks provided thereof for allowing different users to accurately reposition the aiming LED as needed.
Figure 3:
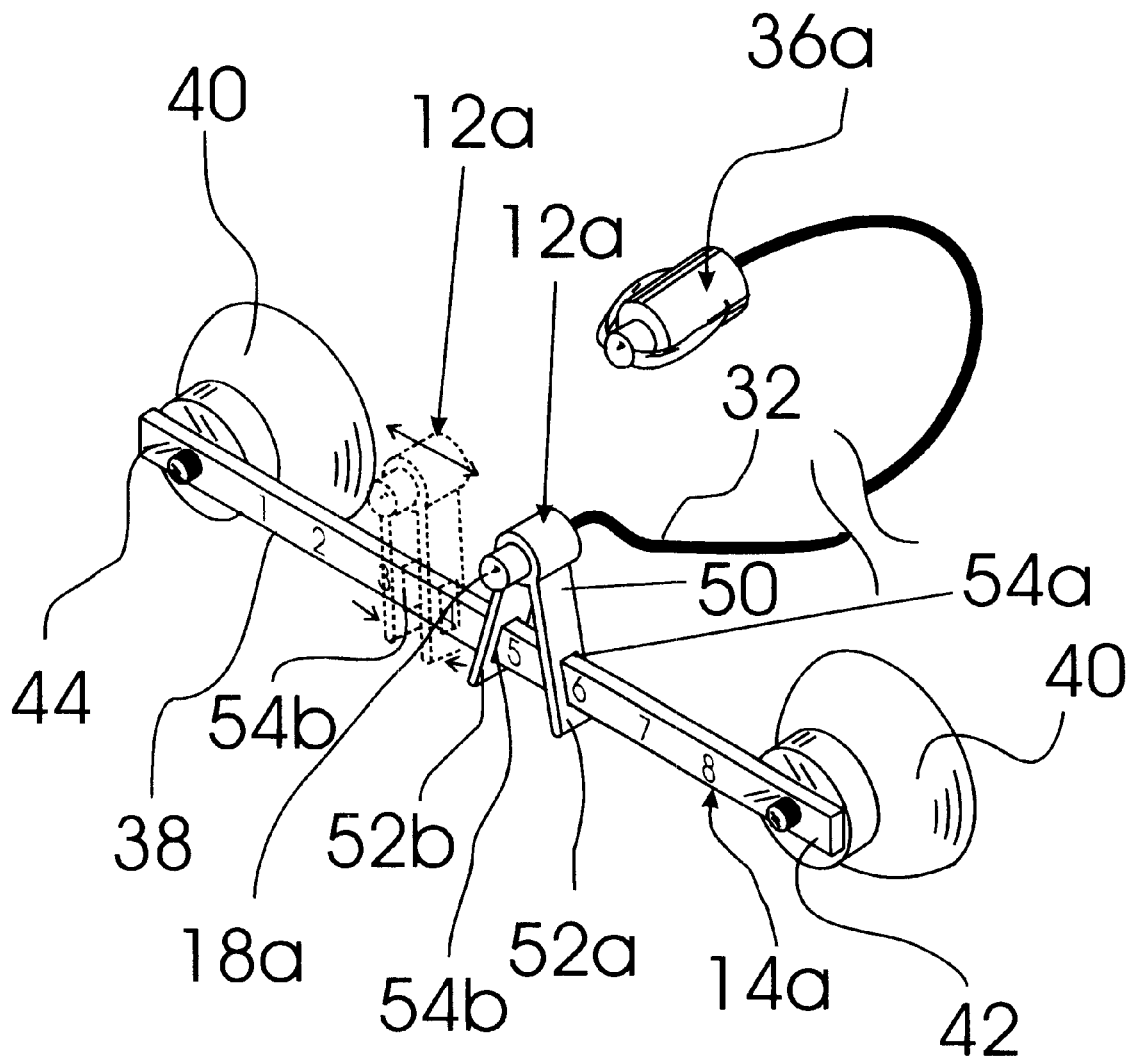
FIG. 3 is a perspective view of the vehicle lane verification device of FIG. 2 with the generic power source block replaced with a vehicle cigarette lighter adapter and showing the user moveable LED clamp mechanism in a locked position on the slide bar assembly with its resilient locking legs biased away from each other to grip the slide bar and in an unlocked position on the slide bar (shown in dashed lines) with the resilient locking legs squeezed together to release the user moveable LED clamp mechanism from the slide bar.
Figure 4:
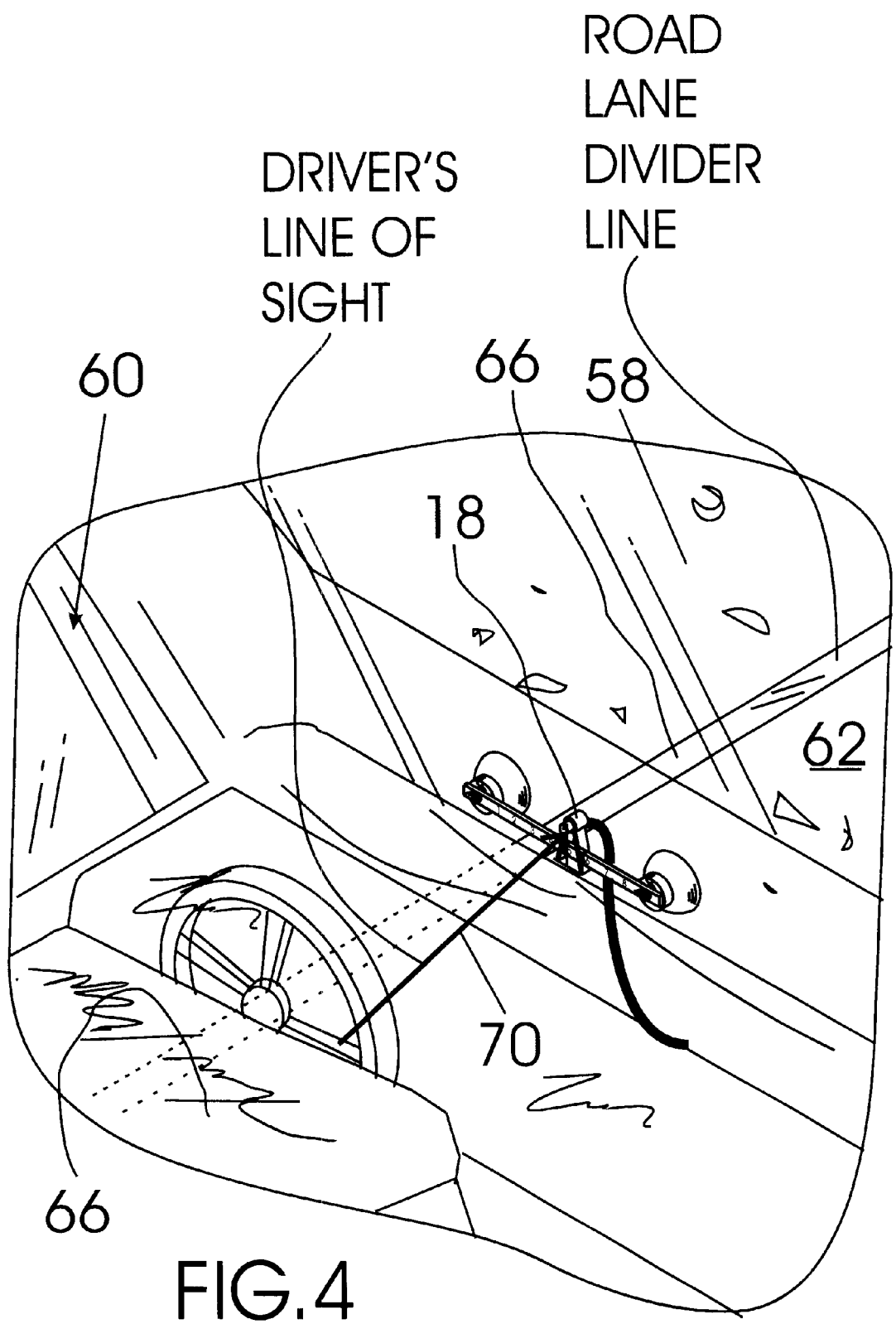
FIG. 4 is a partial perspective view of the exemplary embodiment of the vehicle lane verification device of FIG. 2 attached to a representative vehicle windshield with the aiming LED positioned such that it lies along a line of sight between a driver of the vehicle and the yellow marker line of a roadway.

FIGS. 2–4 show various aspects of a second exemplary embodiment of the vehicle lane verification device of the present invention generally designated 10a. Vehicle lane position verification device 10a includes an LED sighting unit, generally designated 12a, and an attachment mechanism, generally designated 14a, for attaching the LED sighting unit 12a to the windshield 58 of a vehicle 60. Attachment mechanism 14a includes a slide bar 38 having a suction cup 40 secured to each end 42,44 thereof. Suction cups 40 are secured to the interior of vehicle windshield 58 in use.

In this embodiment, LED sighting unit 12a includes an aiming LED 18a supported by a user moveable LED clamp mechanism, generally designated 50. Aiming LED 18a has a power supply cable 32 connectable to an electrical power source 34 such as, for example, a cigarette lighter adapter, generally designated 36, that may be plugged into the cigarette lighter socket of a vehicle 52.

In this embodiment, aiming LED 12a is a red LED, however any color LED may be used without departing from the spirit and bounds of the invention taught herein. Aiming LED 18a is supported by user moveable LED clamp mechanism 50 on slide bar 38. User moveable LED clamp mechanism 50 includes two resilient locking legs 52a,52b each including a slide bar receiving aperture 54a,54b provided therethrough of greater size than the slide bar 38 and biased away from the other resilient locking leg 52a,52b such that the pair of resilient locking legs 52a,52b exert a gripping and holding force against slide bar 38 when the slide bar 38 is inserted through the two slide bar receiving apertures 54a, 54b and the resilient locking legs 52a,52b allowed to resiliently move away from each other. Resilient locking legs 52a,52b release the gripping and holding force against slide bar 38 when resilient locking legs 52a,52b are squeezed toward each other (shown in dashed lines FIG. 3) allowing a user to position the LED sighting unit 12a at any desired location along slide bar 38.

An exemplary vehicle lane position verification method of the present invention includes the steps of: a) providing a vehicle lane position verification device 10,10a as described herein above; b) positioning a vehicle 60 within a lane driving area 62 of a roadway divided by a lane marker line 66 at a desired distance from the lane marker line 66 such that the vehicle 60 is safely within the lane driving area 62 of the roadway; d) positioning a driver in a driver's seat 66 of the vehicle 60 after performing step b); and d) positioning aiming diode 18,18a along the line of sight 70 between the driver's eyes when seated in the normal driving position on the driver's seat 66 and the lane marker line 66 whereby when the vehicle 60 is being driven, maintaining the aiming diode 18, 18a in the line of sight 70 between the driver's eyes when seated in the normal driving position on the driver's seat 66 and the lane marker line 66 ensures that the vehicle 60 is safely within the lane driving area 58 of the roadway.

It can be seen from the preceding description that a vehicle lane verification device and method has been provided.

It is noted that the embodiment of the vehicle lane verification device and method described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A vehicle lane position verification device for use by a vehicle having a windshield, said vehicle lane verification device comprising:

an LED sighting unit; and an attachment mechanism for attaching the LED sighting unit to the windshield of a vehicle;

the attachment mechanism including a slide bar having a suction cup secured to each end thereof;

LED sighting unit including an aiming LED supported by a user moveable LED clamp mechanism;

the aiming LED having a power supply cable in connection with an electrical power source such that the aiming LED emits light of sufficient luminance to be seen in daylight;

the aiming LED being supported by the user moveable LED clamp mechanism on the slide bar;

the user moveable LED clamp mechanism including two resilient locking legs;

each locking leg including a slide bar receiving aperture provided therethrough of greater size than the slide bar;

each locking leg being resiliently biased away from the other resilient locking leg such that the two resilient locking legs exert a gripping and holding force against the slide bar when the slide bar is inserted through the two slide bar receiving apertures and the two resilient locking legs allowed to resiliently move away from each other;

the two resilient locking legs releasing the gripping and holding force against the slide bar when the two resilient locking legs are squeezed toward each other allowing a user to position the LED sighting unit at any desired location along the slide bar.

* * * * *